2,879,310

METHOD OF PREPARING VINYLIDENE CHLORIDE

Roy T. Eby and John E. Fox, Texas City, Tex., assignors to Monsanto Chemical Company, St. Louis, Mo., a corporation of Delaware No Drawing. Application July 22, 1955
Serial No. 523,936

5 Claims. (Cl. 260—654)

The present invention relates to a new method of preparing vinylidine chloride.

The invention is based on the discovery that vinylidine chloride may be produced by reacting 1,1,2-trichloroethane with an alkali metal cyanide in an anhydrous inert organic medium. While it is known that many halogenated organic compounds may be dehydrohalogenated by means of alkalies to produce unsaturated organic compounds, the only agents disclosed in the art as effective are the hydroxides of the alkali or alkaline earth metals and these are generally employed under aqueous conditions. It is most surprising and not to be expected, therefore, that a material such as an alkali metal cyanide can be employed to split off hydrogen chloride from 1,1,2-trichloroethane and so produce vinylidine chloride. Although the alkali metal cyanides possess certain alkaline characteristics, they can by no means be classed with the alkalies of the prior art. This reaction is even more surprising in view of the fact that it is carried out in a non-aqueous medium wherein ionization of the alkali metal cyanide does not occur. The process of this invention is also unusual in view of the fact that alkali metal cyanides have been reacted with 1,2-dichloroethane to produce succinonitrile.

According to the invention, 1,1,2-trichloroethane is heated with an alkali metal cyanide contained in an anhydrous inert organic medium in a suitable container. The resulting suspension is cooled, filtered, and the filtrate is fractionally distilled to recover vinylidene chloride.

The following example is presented to illustrate the invention.

Example

One mole of sodium cyanide (49 g.) was charged with 150 g. of dimethylformamide to a reaction flask equipped with a condenser, stirrer, and dropping funnel. A cold trap followed the condenser. The mixture was heated to a temperature of approximately 75° C. One mole (133.5 g.) of 1,1,2-trichloroethane was added dropwise to the mixture. An immediate increase in temperature was observed and the feed rate and temperature were regulated to control the temperature so that it did not exceed about 76° C. during the hour required for addition of the reactants. After all the reactants had been brought together, the temperature levelled off at about 68° C. and remained at that point throughout the total reaction period of 1.5 hours, during which the mixture was refluxed. The reactants and reaction medium were anhydrous. Sodium cyanide was dried by heating to 80° C. under vacuum. Dimethylformamide and 1,1,2-trichloroethane were dried by distillation.

The reaction mixture was cooled and filtered. The wet precipitate was washed with 1,2-dichloroethane to remove any residual liquid product and the washings were collected for subsequent analysis.

The filtrate was flash-distilled at a temperature below 75° C. to insure that no solids remained in the liquid product. The distillate was then carefully fractionated to determine its composition. An azeotrope of HCN and vinylidene chloride was taken overhead in two "cuts" at atmospheric pressure, the first weighing 41.6 g. and boiling at 16–21° C. and the second weighing 11.8 g. and boiling at 21–26° C. After removal of these fractions, the remainder of the material was distilled under vacuum to recover unreacted 1,1,2-trichloroethane and the dimethylformamide solvent. The azeotropic fractions were analyzed for HCN by absorbing this component in water and titrating for the $CN^-$ ion with $AgNO_3$ using the Liebig indicator. The HCN content of the fractions was 10.3 and 10.7% respectively. The washings mentioned above were also fractionally distilled and 11.8 g. of HCN-vinylidene chloride azeotrope were obtained therefrom, together with a small amount of unreacted 1,1,2-trichloroethane, some solvent dimethylformamide, and the washing liquid 1,2-dichloroethane. A small amount of the HCN-vinylidene chloride azeotrope (3.4 g.) was also collected in the cold trap. Altogether a total of 61.5 g. of vinylidene chloride was produced, representing a yield of 63.4 mole percent.

The preceding example presents a preferred embodiment of the invention and some variation in procedure from that given therein may be made without departing from the scope of the invention. The temperature, for example, may be maintained anywhere within the range from 50° to 150° C., although preferred temperatures lie in the range from 60–80° C.

The reaction mixture is usually heated at atmospheric pressure but may be heated under pressure in an autoclave or bomb, or may even be carried out under vacuum if desired.

Any of the alkali metal cyanides can be used in the process of this invention. In addition to the sodium cyanide used in the example, potassium cyanide, lithium cyanide, etc., can also be used.

While the use of dimethylformamide as the reaction medium constitutes a preferred embodiment of this invention, other anhydrous inert organic mediums can be used. Typical of such materials that can be employed as the reaction medium are methyl Cellosolve, ethyl Cellosolve, tetrahydrofuran, dimethylacetamide, formamide, methylformamide, and various alcohols.

The example describes a batch operation with distillation of the liquid reaction mixture after completion of the reaction to recover the product. The process, however, is adaptable to operation on a continuous basis. In carrying out the process in a continuous manner, both the 1,1,2-trichloroethane and a suspension of the alkali metal cyanide in dimethylformamide, or a mixture of the reactants and solvent, can be fed continuously into a reactor with sufficient heat input to effect the dehydrochlorination and the HCN-vinylidene chloride azeotrope can be distilled off as it is formed, filtered to remove any entrained solids, and subjected to extraction with caustic or water or to extractive distillation to separate HCN and permit recovery of the unsaturated chlorinated product. The residual mixture of solvent and sodium chloride can be withdrawn continuously from the reactor, filtered to remove the solid chloride and the separated dimethylformamide solvent can be recycled to the reactor for re-use.

Stoichiometric, i.e., equimolecular, quantities of the reactants have been found to produce satisfactory results, but either reactant may be used in excess if desired. The manner in which the reactants are brought together is not critical, although it is preferred that the alkali metal cyanide be mixed and heated with the compound to serve as the reaction medium prior to the introduction of the trichloroethane. However, the reactants, if desired, can be mixed in any desired order, either prior to or during the reaction. The amount of inert liquid organic material which serves as the reaction medium may be varied over a wide range, since it functions strictly as a reaction medium, providing for temperature control by heat transfer and serving to facilitate contacting and mixing of the reactants. Generally, to function satisfactorily as a heat transfer medium, at least 150 ml. of the organic compound are required per mole of the alkali metal cyanide employed. Any excess over this minimum may be used, with the maximum allowable being limited only by practical considerations.

What is claimed is:

1. An improved process for the preparation of vinylidene chloride which comprises reacting 1,1,2-trichloroethane with an alkali metal cyanide in an inert organic medium under anhydrous conditions.

2. An improved process for the preparation of vinylidene chloride which comprises reacting 1,1,2-trichloroethane with an alkali metal cyanide in an inert organic medium under anhydrous conditions at a temperature within the range of from about 50° C. to about 150° C.

3. The process as described in claim 2 wherein the alkali metal cyanide is sodium cyanide.

4. The process as described in claim 2 wherein the inert organic medium is dimethylformamide.

5. A process for the preparation of vinylidene chloride which comprises reacting 1,1,2-trichloroethane and sodium cyanide in dimethylformamide under anhydrous conditions at a temperature in the range of from about 60° C. to about 80° C.

References Cited in the file of this patent
UNITED STATES PATENTS

| | | |
|---|---|---|
| 2,134,102 | Cass | Oct. 25, 1938 |
| 2,322,258 | Strosacker et al. | June 22, 1943 |
| 2,543,648 | Strosacker et al. | Feb. 27, 1951 |
| 2,765,349 | Conrad | Oct. 2, 1956 |
| 2,803,678 | Conrad | Aug. 20, 1957 |

FOREIGN PATENTS

| | | |
|---|---|---|
| 56,607 | France | July 23, 1952 |
| | (First addition to No. 917,721) | |

OTHER REFERENCES

Du Pont "Product Information—Dimethylformamide," received in Patent Office, June 21, 1954.